Patented Jan. 10, 1933

1,893,630

UNITED STATES PATENT OFFICE

WILLIAM EARL MESSER, OF NAUGATUCK, CONNECTICUT, ASSIGNOR TO THE NAUGATUCK CHEMICAL COMPANY, OF NAUGATUCK, CONNECTICUT, A CORPORATION OF CONNECTICUT

TREATMENT OF RUBBER

No Drawing.   Application filed March 18, 1930.   Serial No. 436,882.

This invention relates to treatment of rubber and similar vulcanizable materials, particularly to vulcanization of the same in the presence of an alkylated nitrogenous heterocyclic sulphur-containing compound as a vulcanizing ingredient.

An object of this invention is to provide a new class of accelerators. Another object is to provide a process of vulcanizing rubber in the presence of a material of the type mentioned whereby increased tensiles and other desirable properties will be attained in the resulting rubber product.

Accordingly, the invention comprises vulcanizing rubber in the presence of a vulcanizing agent, a metallic oxide such as zinc oxide, and a material comprising the group

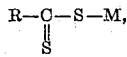

M representing metal, dinitro aryl, aryl methylene, the group

or the group

and R in all instances representing an alkylated nitrogenous heterocyclic saturated radicle. The expression "alkylated" as used herein means the presence of at least one alkyl radicle connected to at least one of the carbon atoms of the heterocyclic nucleus. By "saturated" is meant the joining of all free valences in the heterocyclic ring to hydrogen, as illustrated by the transition of pyridine to piperidine. Typical of such materials is di-(monomethyl-cyclopentamethylene) thiuram disulphide, dinitrophenyl monomethyl-cyclopentamethylene dithiocarbamate, phenyl-methylene (benzal) bis monomethyl-cyclopentamethylene dithiocarbamate, di (monomethyl-cyclopenamethylene) thiuram monosulphide, pipecolonium monomethyl-cyclopentamethylene dithiocarbamate, metal salts of monomethyl-cyclopentamethylene dithiocarbamic acid such as the zinc salt, in fact any carbon disulphide derivative of an alkylated base corresponding to pipecoline

which has the probable formula

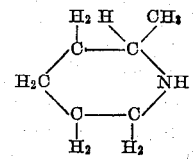

Pipecoline may be used as such or in an impure form such as obtained from bone oil by hydrogenation of the bone oil. The following examples illustrate the preparation of the accelerators.

A—80 parts by weight of the pipecoline are added slowly, cooling meantime with or without the addition of water, to 65 parts by weight of carbon disulphide and 130 parts by weight of 25% aqueous sodium hydroxide or corresponding alkali. The resulting intermediate is oxidized by a mixture of hydrogen peroxide (1 volume of 7½% hydrogen peroxide) and sulphuric acid (2 volumes of 10% sulphuric acid) until the solution is acid in reaction. The mixture is kept cool meantime. The resulting oil, if desired, may be purified and dried in the usual manner using a solvent such as benzol. This oil corresponds to di - (monomethyl - cyclopenta - methylene) thiuram disulphide.

B—20 parts by weight of carbon disulphide are added slowly with cooling to 16 parts by weight of the pipecoline in 160 parts by weight of alcohol. To this are added 13 parts by weight of 50% aqueous sodium hydroxide or corresponding alkali. 39 parts by weight of dinitrochlorbenzene in 160 parts by weight of hot alcohol are added to the mixture with shaking. The product, if desired, may be purified and dried also, it has a melting range of 78° C. to 84° C. This product corresponds to dinitrophenyl ester of monomethyl cyclopentamethylene dithiocarbamic acid.

C—99 parts by weight of pipecoline are dissolved in 320 parts by weight of alcohol and 76 parts by weight of carbon disulphide are added. To the solution are also added 80 parts by weight of 50% sodium hydroxide. The resulting solution is a solution of sodium dithio carbamate in alcohol. To this solution are added 80.3 parts by weight of benzal chloride and the mixture is heated to 60–70° for a short time. A very rapid reaction takes place and a heavy precipitate of crystals is formed. These crystals correspond to phenyl methylene (benzal) bis monomethylcyclopentamethylene dithio carbamate. They melt at 160–162° and are obtained in about 50% yield on the basis of pipecoline used.

D—80 parts by weight of the pipecoline are added slowly with cooling, to 65 parts by weight of carbon disulphide and 130 parts by weight of 25% aqueous sodium hydroxide. The resulting intermediate is treated with zinc sulphate solution until no further precipitate forms. The product is a white solid and corresponds to zinc salt of monomethyl-cyclopentamethylene dithiocarbamic acid.

E—80 parts by weight of pipecoline are added to 34 parts by weight of carbon disulphide. A white solid melting point of about 120° C. is formed and corresponds to pipecolonium pipecolyl dithiocarbamate.

In treating rubber the new materials may be mixed with the rubber on the mill in the usual manner. The parts are by weight in the following illustrative example of a stock made up to contain a carbon disulphide derivative of pipecoline, vulcanized and tested as to tensiles.

|  | A | B |
|---|---|---|
|  | Parts | Parts |
| Smoked sheet | 100 | 100 |
| Zinc oxide | 6 | 6 |
| Blanc fixe | 40 | 40 |
| Sulphur | 2.25 | 2.25 |
| Zinc pipecolyl dithiocarbamate | .1 | .2 |

| Minutes | Pounds steam pressure | Tensils in pounds per square inch | |
|---|---|---|---|
| 60 | 5 | 1583 | 2828 |
| 60 | 10 | 1866 | 2850 |
| 30 | 20 | 1933 | 2661 |
| 60 | 20 | 1986 | 2718 |

With the detailed disclosure above given, it is obvious that modifications will suggest themselves,—for instance, the rubber may be of any desired type and there may be added other compounding ingredients, also antioxident or other materials to modify the properties of the product as desired,—in fact, any suitable materials that may be desired in the finished product, without departing from the principle of the invention, and it is not desired to limit the invention otherwise than as set forth in the appended claims.

Having thus described my invention, what I claim and desire to protect by Letters Patent is:

1. A process of treating rubber which comprises combining therewith a vulcanizing agent, a metallic oxide, a material comprising the group

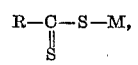

M representing zinc, dinitro aryl, aryl methylene, the group

or the group

and R in all instances representing the radical pipecolyl, and vulcanizing the rubber stock.

2. A process of treating rubber which comprises combining therewith a vulcanizing agent, a metallic oxide, a material comprising the group

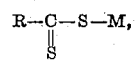

M representing zinc, dinitro phenyl, benzal, the group

or the group

and R in all instances representing the radical pipecolyl, and vulcanizing the rubber stock.

3. A process of treating rubber which comprises combining therewith sulphur, zinc oxide, zinc monomethyl-cyclopenamethylene dithiocarbamate, and vulcanizing the rubber stock.

4. A vulcanized rubber product derived from rubber combined with a vulcanizing agent, a metallic oxide, and a material comprising the group

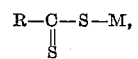

M representing zinc, dinitro aryl, aryl methylene, the group

or the group

and R in all instances representing the radical pipecolyl.

5. A vulcanized rubber product derived from rubber combined with a vulcanizing agent, a metallic oxide, and a material comprising the group

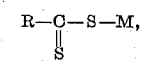

M representing zinc, dinitro phenyl, benzal, the group

or the group

and R in all instances representing the radical pipecolyl.

6. A vulcanized rubber product derived from rubber combined with sulphur, zinc oxide, and zinc monomethyl-cyclopentamethylene dithiocarbamate.

7. A process of producing vulcanized rubber which comprises vulcanizing a vulcanizable rubber stock in the presence of a methyl cyclopentamethyl dithiocarbamate comprising the group

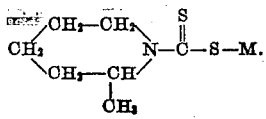

where M is a monovalent organic radical, or metal.

8. A process of producing vulcanized rubber which comprises vulcanizing a vulcanizable rubber stock in the presence of a monomethyl-cyclopentamethylene dithiocarbamate comprising the group

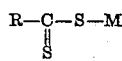

where R represents the radical pipecolyl and M is a monovalent organic radical, or metal.

9. A process of treating rubber which comprises combining therewith a vulcanizing agent, zinc oxide and a di-(monomethylcyclopentamethylene)thiuram sulphide, and vulcanizing the rubber stock.

10. A process of treating rubber which comprises combining therewith a vulcanizing agent, zinc oxide and a di-(monomethylcyclopentamethylene) thiuram disulphide, and vulcanizing the rubber stock.

11. A vulcanized rubber product derived from rubber combined with a vulcanizing agent, zinc oxide and a di-(monomethylcyclopentamethylene) thiuram sulphide.

12. A vulcanized rubber product derived from rubber combined with a vulcanizing agent, zinc oxide and a di-(monomethylcyclopentamethylene) thiuram disulphide.

13. A process of producing vulcanized rubber which comprises vulcanizing a vulcanizable rubber stock in the presence of pipecolonium monomethyl-cyclopentamethylene dithiocarbamate.

Signed at Naugatuck, county of New Haven, State of Connecticut, this 14th day of March, 1930.

WILLIAM EARL MESSER.